United States Patent
Wrathall

(10) Patent No.: US 11,552,554 B2
(45) Date of Patent: *Jan. 10, 2023

(54) ELECTRICAL CIRCUITS FOR POWER FACTOR CORRECTION BY MEASUREMENT AND REMOVAL OF OVERTONES USING A CONSTANT OR SLOWLY VARYING FIRST FREQUENCY

(71) Applicant: Robert S. Wrathall, Scotts Valley, CA (US)

(72) Inventor: Robert S. Wrathall, Scotts Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/237,973

(22) Filed: Apr. 22, 2021

(65) Prior Publication Data

US 2022/0166306 A1 May 26, 2022

Related U.S. Application Data

(63) Continuation of application No. 17/102,035, filed on Nov. 23, 2020, now Pat. No. 10,998,815.

(51) Int. Cl.
*H02M 1/42* (2007.01)
*H02M 1/12* (2006.01)
(Continued)

(52) U.S. Cl.
CPC ........... *H02M 1/4208* (2013.01); *H02M 1/12* (2013.01); *H02M 5/293* (2013.01); *H02M 1/0009* (2021.05)

(58) Field of Classification Search
CPC . H02M 1/12; H02M 5/293; H02M 2001/0009
See application file for complete search history.

(56) References Cited

U.S. PATENT DOCUMENTS 3,824,446 A 7/1974 Forster et al.
4,104,576 A 8/1978 Frank
(Continued)

OTHER PUBLICATIONS

Erickson et al., Fundamentals of Power Electronics (2d ed., Springer Science + Business Media) 2001, pp. 143-145.
(Continued)

*Primary Examiner* — Yusef A Ahmed
(74) *Attorney, Agent, or Firm* — Carr & Ferrell LLP

(57) ABSTRACT

Provided are electrical circuits and methods for power factor correction. An example method includes receiving, by converter, an input voltage at a fundamental frequency and generating an output voltage; generating, based on the output voltage, a first measurement signal; subtracting a first reference signal from the first measurement signal to obtain a first error signal; generating an adaptive current sense signal, generating a reference voltage based on the input voltage, subtracting the reference voltage from the current sense signal thus generating a second measurement signal to control the current measurement; subtracting the second measurement signal from the input voltage to obtain a difference signal, wherein the difference signal is largely minimized by removing overtones of the fundamental frequency; generating, based on the difference signal, a second error signal; using a sum of the second error signal as a first order correction to the first error signal to regulate the converter.

36 Claims, 5 Drawing Sheets

(51) Int. Cl.
  *H02M 5/293* (2006.01)
  *H02M 1/00* (2006.01)

(56) References Cited

U.S. PATENT DOCUMENTS

| | | | |
|---|---|---|---|
| 4,774,454 A | 9/1988 | Yamaguchi et al. | |
| 5,132,606 A * | 7/1992 | Herbert | H02J 9/061 323/272 |
| 5,349,284 A * | 9/1994 | Whittle | H02M 1/4225 323/210 |
| 5,377,092 A | 12/1994 | Rowand et al. | |
| 5,557,560 A | 9/1996 | Dix et al. | |
| 5,561,595 A | 10/1996 | Smith | |
| 5,751,138 A | 5/1998 | Venkata et al. | |
| 6,344,986 B1 | 2/2002 | Jain et al. | |
| 6,465,990 B2 | 10/2002 | Acatrinei et al. | |
| 6,608,770 B2 | 8/2003 | Vinciarelli et al. | |
| 6,650,092 B1 * | 11/2003 | Lidak | H02M 1/4225 323/222 |
| 6,657,417 B1 | 12/2003 | Hwang | |
| 7,057,907 B2 | 6/2006 | Oh | |
| 7,084,369 B2 | 8/2006 | Sosnowski | |
| 7,148,664 B2 * | 12/2006 | Takahashi | G05F 1/70 323/222 |
| 7,157,886 B2 | 1/2007 | Agarwal et al. | |
| 7,274,579 B2 | 9/2007 | Ueda | |
| 7,378,805 B2 | 5/2008 | Oh et al. | |
| 7,525,821 B2 | 4/2009 | Hansson et al. | |
| 7,706,161 B2 | 4/2010 | Quazi | |
| 7,719,248 B1 * | 5/2010 | Melanson | H02M 1/4225 323/283 |
| 7,719,862 B2 | 5/2010 | Wrathall | |
| 7,759,910 B2 | 7/2010 | Lindahl et al. | |
| 8,018,744 B1 | 9/2011 | Wrathall | |
| 8,198,873 B2 * | 6/2012 | Young | H02M 1/4208 323/207 |
| 8,379,419 B2 * | 2/2013 | Yabuzaki | H02M 1/4225 361/91.1 |
| 8,542,503 B2 | 9/2013 | Wrathall | |
| 8,619,442 B2 | 12/2013 | Wrathall | |
| 10,998,815 B1 | 5/2021 | Wrathall | |
| 2003/0222633 A1 * | 12/2003 | Hwang | H02M 1/36 323/282 |
| 2005/0212501 A1 | 9/2005 | Acatrinei | |
| 2005/0270814 A1 | 12/2005 | Oh | |
| 2006/0022648 A1 * | 2/2006 | Ben-Yaakov | H02M 1/4225 323/222 |
| 2006/0192537 A1 * | 8/2006 | Hagen | G05F 1/70 323/222 |
| 2007/0236963 A1 | 10/2007 | Yasumura | |
| 2008/0246444 A1 * | 10/2008 | Shao | H02M 1/4225 323/207 |
| 2008/0246445 A1 * | 10/2008 | Wrathall | G05F 1/70 323/207 |
| 2009/0027925 A1 * | 1/2009 | Kanouda | H02M 1/4233 363/21.13 |
| 2009/0141524 A1 * | 6/2009 | Fagnani | G05F 1/70 363/89 |
| 2011/0157927 A1 * | 6/2011 | Adragna | H02M 3/3376 363/26 |
| 2012/0044725 A1 * | 2/2012 | Wrathall | G05F 1/70 363/45 |
| 2012/0092900 A1 * | 4/2012 | Orr | H02M 1/4208 363/21.03 |
| 2012/0195082 A1 * | 8/2012 | Wrathall | H02M 1/4225 363/125 |
| 2013/0148396 A1 * | 6/2013 | Walters | H02M 1/4225 363/126 |
| 2013/0194845 A1 * | 8/2013 | Bianco | H02M 1/4225 363/90 |
| 2014/0071723 A1 | 3/2014 | Wrathall | |
| 2015/0117074 A1 * | 4/2015 | Miao | H02M 1/4225 363/44 |
| 2015/0145485 A1 * | 5/2015 | Xie | H02M 1/44 323/210 |
| 2016/0134182 A1 * | 5/2016 | Zhang | H02M 1/00 363/15 |
| 2016/0190912 A1 * | 6/2016 | Lim | H02M 1/4225 363/84 |
| 2017/0279376 A1 * | 9/2017 | Siri | H03L 7/099 |
| 2018/0198371 A1 * | 7/2018 | Gritti | H02M 3/33507 |
| 2018/0278181 A1 * | 9/2018 | Afridi | H02M 1/4233 |
| 2019/0006940 A1 * | 1/2019 | Jans | H02M 1/08 |
| 2019/0044433 A1 * | 2/2019 | Elferich | H02M 3/338 |
| 2019/0044434 A1 * | 2/2019 | Elferich | H02M 1/08 |
| 2019/0081553 A1 * | 3/2019 | Sugimoto | H02M 7/217 |
| 2019/0081565 A1 * | 3/2019 | Jans | H03K 5/2472 |
| 2019/0199204 A1 * | 6/2019 | Bhandarkar | H02M 3/1563 |
| 2020/0091815 A1 * | 3/2020 | Boncato | H02M 1/32 |
| 2022/0166307 A1 | 5/2022 | Wrathall | |

OTHER PUBLICATIONS

"Power Factor Correction Handbook," HBD853/D, Rev. 2, ON Semiconductor, Aug. 2004, pp. 5-17, 73-79, 91-95.

Zhang et al., "Capacitors Voltage Ripple Complementary Control on Three-Level Boost Fed Single-Phase VSI with Enhanced Power Decoupling Capability," IEEE Trans. on Power Electronics, vol. 36, No. 12, Dec. 2021, pp. 14220-14236.

\* cited by examiner

ELECTRICAL CIRCUITS FOR POWER FACTOR CORRECTION BY MEASUREMENT AND REMOVAL OF OVERTONES USING A CONSTANT OR SLOWLY VARYING FIRST FREQUENCY

CROSS REFERENCE TO RELATED APPLICATION

This Non-Provisional patent application is a continuation of, and claims priority benefit of, U.S. patent application Ser. No. 17/102,035, filed Nov. 23, 2020, entitled "Electrical Circuits for Power Factor Correction by Measurement and Removal of Overtones." The aforementioned disclosure is hereby incorporated by reference herein in its entirety including all references cited therein.

FIELD

The present application relates generally to electrical circuits, and more specifically, to electrical circuits and methods for power factor correction by measurement and removal of overtones.

BACKGROUND

Generators and transformers and electrical loads are connected together in power distribution systems that utilize alternating current (AC) power. The generators and transformers generally are designed in such a manner that a current waveform of any load should be sinusoidal and of the same shape and phase as the input power voltage supplied by the generators and transformers. In the power distribution systems, where the load current is sinusoidal and in-phase with the input power voltage, the power factor is one. Poorly conditioned loads have power factors less than 1.

Deviations of the current waveform of the load from the sinusoidal shape and phase shifts reduce the power factor and may cause losses in the power distribution systems. These losses may appear as reactive voltages and currents and harmonic generation and result in increased power dissipation in the generators, transformers, and so forth. The increased power dissipation causes reduction in power efficiency and waste of energy and other problems in the power grid. Therefore, there is a need for removal of the deviations of the waveform of the load current from the sinusoidal shape, which appear as overtones of the fundamental frequency of the input power voltage, in order to correct and improve the power factor of the load. Phase errors also need to be removed.

Existing solutions for the removal of the deviations typically involve a high-speed current sense loop which operates in a nanosecond time frame and a high-speed current sense. As the output demand or input voltage for a load current is reduced, which happens during each cycle in the AC input, the frequency of operation of the current sense loop needs to increase. However, the frequency is difficult to increase when sensing the current of light loads. Furthermore, use of high-speed current sense loop is power inefficient because switching losses increase for lower power demands. Additionally, many of the existing solutions require a multiplier circuit which multiplies the feedback value with the measured rectified AC signal. Using the multiplier circuit results in increases of the circuit complexity.

Another disadvantage of these types of circuits is that they do not operate at a constant frequency. This makes it difficult to filter switching noise and electromagnetic inference (EMI).

SUMMARY

This summary is provided to introduce selected concepts in a simplified form that are further described below in the Detailed Description. This summary is not intended to identify key features or essential features of the claimed subject matter, nor is it necessarily intended to be used as an aid in determining the scope of the claimed subject matter.

According to an example embodiment of the present disclosure, an electrical circuit for power factor correction is provided. The electrical circuit may include a converter using switches and inductors to generate a regulated output. The converter can be configured to receive an input power signal having an input voltage, at a fundamental frequency and generate an output power signal having a regulated direct current output voltage. The converter is regulated by a first control signal. The electrical circuit may include a reference voltage source configured to provide a reference. The electrical circuit may include a first measuring circuitry configured to generate, based on the output voltage, a first measurement signal. The electrical circuit may include a first operational circuitry configured to subtract the first reference signal from the first measurement signal, called the first difference, to obtain a first error signal.

The electrical circuit may include an adaptive current sensing circuitry. The current sense signal is responsive to the input current and to a second control signal.

The electrical circuit may include a second reference circuitry configured to generate, based on the input voltage, a second reference signal. The second measurement signal may include a sinusoidal or rectified sinusoidal signal. The electrical circuit may include a second operational circuitry configured to subtract the second reference signal from the current sense signal, called the second difference, to obtain the second control signal by means of a second operational circuit. This control signal has a bandwidth considerably smaller than the frequency of the input power supply. The second difference can be minimized by controlling a response of the adaptive sensing circuitry using the second control signal such that the difference signal includes largely only overtones of the fundamental frequency and largely lack a signal corresponding to the fundamental frequency. A third operational circuit can generate, based on the second difference, a second error signal. This second error signal has a bandwidth much wider than the frequency of the input to the power supply and substantially wider the first error signal. The electrical circuit can include a summing circuitry configured to add the second error signal and the first error signal to obtain a first control signal, and provide the first control signal to control the switches of the converter. The first control signal can be used to regulate the output of the converter and to increase the power factor, simultaneously.

The converter may include an inductor, a switch, a diode and a gate driver and control. The switch can be configured to regulate the current in the inductor. In other embodiments, the converter may include one or more transformers, switches, diodes, gate drivers and control circuitry with the switches being configured to regulate currents in transformers or inductors.

The bandwidth of the first error signal can be less than the bandwidth of the second error signal. The adaptive current sensing circuitry may include a voltage variable resistor. The current measurement circuitry in other embodiments may include a resistor, a digitally controlled resistor, a Metal Oxide Silicon Field Effect Transistor (MOSFET), a junction gated field-effect transistor (JFET), or current transformer.

The second error signal may be treated as a first order perturbation on the first error signal. The first error signal ought to be able to dominate the control loop.

In this embodiment a switch can be controlled by a pulse width modulator. The output of the switch can be controlled by regulating a duty cycle of the pulse width modulator without changing the frequency of turning the switch on and off.

In other embodiments the converter may be of any type, conventionally called but not limited to boost, buck-boost, buck, Cuk, resonant, and even critical conduction mode. The addition of the second error signal as a first order correction may be added to the first error signal in any of them in order to add power factor correction in addition to the primary function of voltage or current regulation at the output. Embodiments of the present disclosure allow do not impact the design of the converter except for adding the second error signal to the first error signal and a new current measurement circuit.

In this embodiment the converter consists of a switch, an inductor, a diode, a gate driver, and the control circuitry to control the gate driver. The converter in other embodiments may include inductors and two or more switches configured to control a current flowing through inductors. The first error signal can be responsive to a current of the output power signal.

According to another example embodiment, an electrical circuit for PFC is provided. The electrical circuit may include a converter previously described. The converter can be configured to receive an AC input power signal having an input voltage at a fundamental frequency and to generate a DC output power signal having an output voltage or current. The electrical circuit can include a first reference signal voltage source. The electrical circuit can include a first measuring circuitry configured to generate, based on the output voltage, a first measurement signal. The electrical circuit may include a first operational circuitry configured to subtract the first reference signal from the first measurement signal, called the first difference, to obtain a first error signal. The electrical circuit can include current sensing circuitry configured to generate a current sense signal based on the input current. The electrical circuit may include a second reference circuitry configured to generate, based on the input voltage, a second reference signal. The second reference signal is a sinusoidal signal proportional to the rectified input voltage. The difference between the current sense signal and the second reference signal is called the second difference.

The electrical circuit can include a regulating circuitry configured to control magnitude of the second reference signal with the second control signal. The electrical circuit can include a second operational circuitry configured to subtract the second measurement signal from the current sense, called the second difference, and create a second control signal. The second difference can be minimized by controlling, by the regulating circuitry, a response of the second reference circuitry such that the second difference includes mainly overtones of the fundamental frequency and largely lacks a signal corresponding to the fundamental frequency. A third operational circuitry can be configured to generate, based on the second difference, a second error signal. The bandwidth of the second error signal may be substantially greater than the input frequency and the bandwidth of the first error signal. The amplitude of the second error signal may be less than the amplitude of the first error signal. The electrical circuit can include a summing circuitry configured to add the second error signal and the first error signal to obtain a first control signal to control the switch, where the summing signal is used to regulate the switch of the converter. The result is a regulated output of the converter and a maximization of the power factor.

According to another example embodiment of the present disclosure, an electrical circuit power supply with power factor correction is provided. The electrical circuit power supply may include one or more of the following: inductors, transformers, switches, amplifiers, comparators, analog-to-digital converters, digital-to-analog converters, and diodes. The electrical circuit power supply may include a means for controlling the switches with a first control signal in order to control currents in the inductors, transformers, and switches in order to control and regulate an output voltage or an output current, and to control a power factor of an input current from a sinusoidal voltage source or rectified sinusoidal voltage source at a fundamental frequency.

The electrical circuit power supply may include a means of measuring one of the output voltage or output current and comparing one of the output voltage or output current to a first reference signal, and generating a first error signal responsive to a first difference between the first reference signal and one of the output voltage or the output current, the first error signal having a first frequency and a first bandwidth.

The electrical circuit power supply may include current measurement a means for measuring the input current and generating a current measurement signal from the input current.

The electrical circuit power supply may include a means for controlling a gain or magnitude of the current measurement signal generated by the current measuring means.

The electrical circuit power supply may include a means for generating a second reference signal, the second reference signal comprising a sinusoidal reference voltage or a rectified sinusoidal reference voltage derived from the input voltage, and creating a second difference by subtracting the second reference signal from the current measurement signal.

The electrical circuit power supply may include a means, a second operational circuit, of creating a second control signal proportional to the second difference, the second difference signal having a second bandwidth and a second frequency, the second control signal controlling one of a gain or magnitude of the current measurement signal in order to minimize the second difference.

A third operational circuitry can be configured to generate, based on the second difference, a second error signal. The electrical circuit can include a summing circuitry configured to add the second error signal and the first error signal to obtain a first control signal to control the switch, where the summing signal is used to regulate the switch of the converter. The result is a regulated output of the converter and a maximization of the power factor.

The current measurement means may include a field effect device. The current measurement may include a Metal Oxide Silicon Field Effect Transistor (MOSFET). The current measurement means may include one of the following: a digitally controlled resistor or a digital-to-analog converter. The current measurement means may utilize a current transformer.

Each of the second control signal, the first error signal, second error, first control signal, and second difference may be a voltage or a digital signal.

The bandwidth of the second control signal can be substantially less than the fundamental frequency while the bandwidth of the second error signal can be substantially greater than the fundamental frequency. The bandwidth of the second error signal can be also substantially greater than the bandwidth of the first error signal. A magnitude of the second error signal can be substantially less than a magnitude of the first error signal.

According to yet another example embodiment of the present disclosure, a method for the PFC is provided. The method may include receiving, by a converter controlled via a switch, an input power signal having an input voltage at a fundamental frequency. The method may also include generating, by the converter, an output power signal having an output voltage. The converter is controlled by a first control signal. The method may also include, providing, by a reference voltage source, a reference signal. The method may also include generating, by a first measuring circuitry, based on the output voltage, a first measurement signal. The method may also include, subtracting, by a first operational circuitry, the first reference signal from the first measurement signal to obtain a first error signal. The difference between the first reference and the first measurement signal is the first difference.

The method may also include generating, by an adaptive sensing circuitry a current sense signal. The method may also include generating, by a second reference signal, based on the input voltage, a second reference signal. The difference is called the second difference. The method may also include subtracting, by a second operational circuitry, the second measurement signal from the second reference signal to obtain a second control signal.

The second difference can be minimized by controlling a response of the adaptive current sensing circuitry by means of the second reference signal such that the second difference include substantially only overtones of the fundamental frequency and lack substantially a signal corresponding to the fundamental frequency. The method may also include generating, by a third operational circuitry, based on the second difference, a second error signal. The method may also include adding, by a summing circuitry, the second error signal and the first error signal to obtain a first control signal. The method may also include providing, by the summing circuitry, the first control signal to the switch, wherein the first control signal is used to regulate the switch of the converter to control the output and to maximize the power factor simultaneously Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
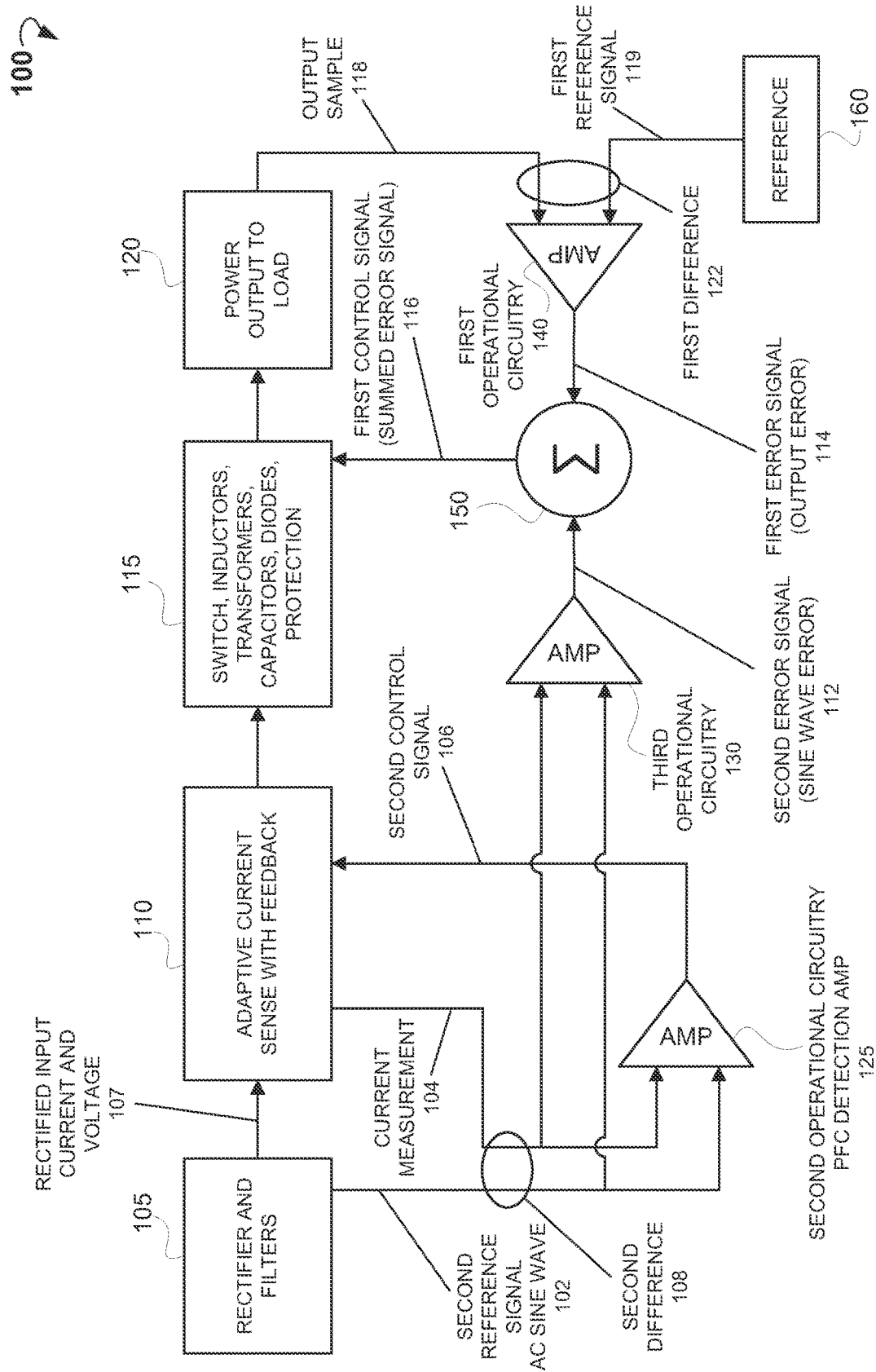
FIG. 1 is a high-level block diagram of an example electrical circuit for PFC, according to some embodiments of the present disclosure.

The technology disclosed herein relates to electrical circuits and methods for power factor correction (PFC) by measurement and removal of overtones or harmonics generated by loads connected to power grids. Embodiments of the present disclosure may allow improving the PFC in electrical circuits, which, in turn, may allow increasing efficiency of power grids. Furthermore, embodiments of the present disclosure may result in better performance of power grids in the best-case conditions and allow extending operating ranges of power grids and electrical circuits. Unlike existing technological solutions for the PFC, embodiments of the present disclosure may facilitate more efficient PFC in power grids when alternating current (AC) passes through a range of low current and low voltage each cycle, as the AC voltage goes through zero. Specifically, embodiments of the present disclosure may allow improving PFC in converters, for example, AC to direct current (DC) converters, and, thereby, increase power efficiency of the converters.

Embodiment of the present disclosure may solve at least some issues presented in current solutions for power factor correction. For example, embodiments of the present disclosure can allow operating electrical circuits for PFC at a largely constant frequency than existing PFC solutions, which facilitates reducing switching noise and Electro-Magnetic Interference (EMI). Embodiment of the present disclosure may also allow removal of the deviations of the waveform of the load current from the sinusoidal shape, which appear as overtones or harmonics of the fundamental frequency of the input power voltage in order to correct and improve the power factor of the load. Embodiment of the present disclosure may also facilitate removing phase errors in electrical circuits.

Embodiments of the present disclosure may improve designs of electrical circuits for PFC by replacing high speed current feedback loops, for example, a high speed current sense, with low frequency loops. Embodiments of the present disclosure may allow avoiding the use of multiplier circuits in PFC circuits. Embodiments of the present disclosure involve current sensing for PFC and utilize removal of overtones of the sensed current. Therefore, embodiments of the present disclosure can be used with any converter having a circuit with an output voltage control loop and a voltage control error signal, or an output current control loop with a current control signal. Embodiment of the present disclosure may allow measuring of how closely the input current follows the sinusoidal input voltage. Such circuits allow improving PFC by increasing the operational range of power factor control.

According to an example embodiment of the present disclosure, an electrical circuit for PFC may include a converter using a switch, an inductor, and a diode. The converter can be configured to receive an input power signal having an input voltage at a fundamental frequency and generate a substantially constant output power signal having an output voltage. The electrical circuit may include a reference voltage source configured to provide a reference signal having a reference voltage. The electrical circuit may include a first measuring circuitry configured to generate, based on the output voltage, a first error signal 114. The electrical circuit may include a first operational circuitry 140 configured to subtract the first reference signal from the first measurement signal (also referred to as the first difference 122), to obtain a first error signal. The operation of the first error signal is to largely minimize the value of the first difference 122.

The electrical circuit may include adaptive current sense circuitry configured to generate, proportional to the input current, a current sense signal 104. The second measurement method includes a sinusoidal reference signal 102. The electrical circuit may include a second operational circuitry 125 configured to subtract the sinusoidal reference from the second measurement signal to obtain a second control signal 106. The second difference can be minimized by controlling the response of the adaptive sensing circuitry such that the second difference 108 includes mainly overtones of the fundamental frequency and largely lacks a signal corresponding to the fundamental frequency. The third operational circuitry 130 can generate, based on the second difference, a second error signal. The electrical circuit can include a summing unit 150 configured to add the second error signal and the first error signal to obtain the first control signal 116 to control the switch. The first control signal 116 can be used to regulate the switch of the converter in order to regulate the output and to maximize the power factor FIG. 1 is a high-level block diagram of an example electrical circuit 100 for PFC, according to an example embodiment. The electrical circuit 100 can include rectifier and filters 105, adaptive current sense with feedback 110, converter 115, power output 120, PFC detection amplifier (also called the second operational circuitry 125), amplifier 130 (also called the second operational amplifier 140), (also called the first operational circuitry), summing unit 150, and reference 160. In other embodiments the converter 115 may include switches, inductors, diodes, transformers, amplifiers, and other circuitry including digital signal processors.

The rectifier and filters 105 may be configured to convert a power AC electrical signal, which periodically reverses the direction, into a rectified sinusoidal AC electrical supply 107 (current and voltage) having a fundamental frequency. The rectified sinusoidal AC electrical supply 107 may then provide power to converter 115 via the adaptive current sense with feedback 110.

The converter 115 may receive the rectified sinusoidal AC electrical supply and convert the rectified sinusoidal AC electrical supply into a DC electrical supply. The switches of converter 115 may include metal-oxide-semiconductor field-effect transistors (MOSFETs). An operational cycle of the converter may involve switching the switch on and off to charge and discharge an inductor. The rectified AC electrical current received by the converter 115 may be distorted from a sinusoidal shape and shifted in phase due to the operation of the switches, diodes, inductors, and control circuitry. This can result in a presence of overtones of the fundamental frequency, reactive phase shifts, and reduced power factor in the input supply received by the converter 115.

The power output 120 may include a first measuring circuitry configured to generate, based on the output voltage, an output sample signal 118 (also referred to as a first measurement signal). The reference 160 may include a voltage source configured to provide a reference signal 119. The amplifier 140 can be configured to amplify the difference between the reference signal 119 from the output sample signal 118, to obtain a first error signal 114 by means of the first operational circuitry 140. The difference between the reference signal 119 from the output sample signal 118 is referred herein to as the first difference 122.

The adaptive current sense with feedback 110 may be configured to sense the input current received by the converter 115 and generate an input current sense signal 104). The current sense signal 104 is then provided to PFC detection amplifier also called the second operational circuitry 125.

The rectifier and filters 105 may include a second reference circuit configured to generate, based on the AC input voltage, an AC sine wave reference signal 102. The AC sine wave reference signal 102 can be a rectified sinusoidal signal. The AC rectified sine wave reference signal 102 is provided to PFC detection amplifier 125.

PFC detection 125 can be configured to amplify the difference between the reference signal 102 from the current sense signal 104. The second difference 108 is found by subtracting the value of the sine wave reference signal 102 from the current sense signal 104, and the second difference 108 is presented to the PFC detection amplifier 125 which generates the second control signal 106. The second control signal 106 causes the adaptive current sense with feedback 110 to minimize the second difference 108. The effect of this minimization is largely due to the removal of the fundamental frequency from the second difference 108. The second difference 108 then largely contains only harmonics or overtones of the fundamental frequency. The bandwidth of the second control signal 106 is much less than the input AC frequency.

The amplifier 130 (also called the third operational circuitry) receives the second difference 108. The amplifier 130 can be configured to generate, based on the second difference 108, a second error signal 112. The summing unit 150 combines the second error signal 112 and the first error signal 114 to obtain the first control signal 116 (also referred to as a summing signal) and provide the first control signal 116 to control the converter 115. The first control signal 116 can be used to regulate the converter to regulate operational cycles of the converter 115.

The action of the second error signal 112 is to largely remove the harmonics or overtones, and also phase shifts, in the rectified sinusoidal AC electrical supply 107 by minimizing the overtones or harmonics in the second difference, while controlling the output voltage or current 118 via the first error signal 114.

The operation of the second control signal 106 is to largely remove the fundamental frequency signal from the second difference 108. The operation of the second error signal 112 is to largely remove the remaining harmonics of the fundamental from the second difference 108 which removes them from the output.

Figure 2:
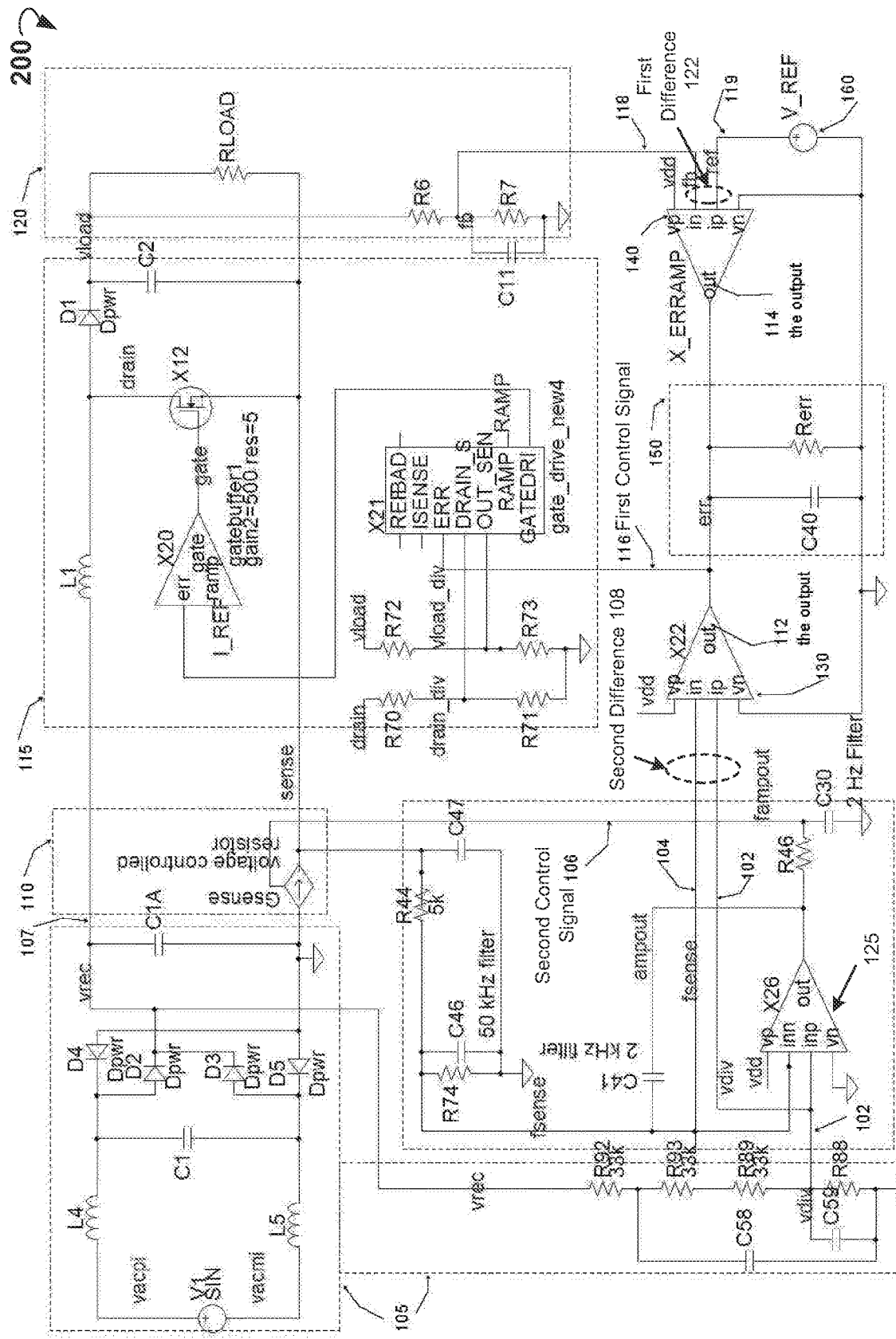
FIG. 2 is a block diagram showing an example electrical circuit for PFC, according to an example embodiment.

FIG. 2 is a block diagram showing an example electrical scheme 200 for power factor correction, according to an example embodiment. The electrical scheme 200 can be an implementation of the electrical circuit 100 shown in FIG. 1.

In electrical scheme 200, the rectifier and filters 105 is carried out by inductors L4 and L5, capacitors C1 and C1A, and diodes D2, D3, D4, and D5. The AC sine wave reference circuit of the rectifier and filters 105 is carried out by resistors R88, R89, R92, and R93 and capacitors C58 and C59. The adaptive current sense with feedback 110 is carried out by the voltage controlled resistor Gsense, which may be a MOSFET. Capacitors C1 and C1A may be sized to supply energy to the converter when the input voltage falls to zero.

The converter 115 is carried out by inductor L1, gate driver X20, MOSFET X12, and diode D1. The power output 120 includes the first measurement circuitry carried out by capacitor C11 and resistors R6 and R7. The devices Rload and C2 are the output load.

PFC detection amplifier (or second operational circuitry) 125 is carried out by amplifier X26, resistor R46, capacitors C41 and C30, resistors R74 and R44, and capacitors C46 and C47.

In the electrical scheme 200, the amplifier (third operational circuitry) 130 is amplifier X22, the amplifier 140 (or first operational circuitry) is amplifier X_ERRAMP, both current mode amplifiers, and the summing unit 150 is carried out by resistor Rerr and capacitor C40 where the output currents are summed.

The rectifier and filters 105 is designed to remove switching noise from the supply lines. One of the terminals of the rectifier and filters 105 is designated as a circuit ground.

The voltage controlled resistor Gsense 110 is connected to the circuit ground. The resistor Gsense 110 is designated as the adaptive current sense with feedback. In some embodiments, the variable voltage resistor Gsense can be implemented by a low resistance MOSFET device using the gate as a control node. The voltage on node SENSE 104 is the result of the total current flowing in the rectifier and filters 105. The electrical circuit 200 is designed to make the current flowing in the rectifier and filters 105 to be sinusoidal and in-phase with the input voltage.

The other terminal of the voltage controlled resistor Gsense 110 is connected to the source of the power switching device denoted herein as MOSFET X12, the output filter capacitor C2, and load Rload. The resistance of the resistor Gsense 110 may be low, typically tens of milliohms, to measure a current of tens of amperes.

The power switch MOSFET X12 may be a high voltage and high current device. The power switch MOSFET X12 can be driven by a high speed, low impedance, gate driver X20. The gate driver in turn can be controlled by a voltage generated by the pulse width modulator x21 to perform pulse width modulation of the converter 115. Logic controlling the gate drive may have an error handling logic which protects the switching power device from error conditions. One of the error conditions is determined by measuring the power device current to protect the switch X12. The cycle is ended if current exceeds a threshold. Another condition is detected at the end of the cycle by determining that the current in the input inductor L1 has fallen to zero by the end of the cycle also to protect the switch. The third condition is to make sure that the output voltage does not exceed a threshold to protect the load.

The positive side of the rectifier and filters 105 is connected to the inductor L1. The inductor L1 serves as an energy storage device which is used to transfer packets of energy at high frequency through rectifier diode D1 to the output load Rload and output filter C2. The output filter capacitor C2 smooths high frequency energy dumps to create a regulated output voltage to the load Rload. The power switch MOSFET X12 causes energy to be stored in the inductor L1 which is then transferred to the load Rload through diode D1.

A resistor divider including resistors R93, R89, and R88 produces a voltage at VDIV 102. The voltage VDIV 102 may be on the order of around a volt and may be divided down from a source of hundreds of volts. The voltage at VDIV 102 may have the form of a rectified sine wave.

The electrical circuit 200 is designed to make the filtered voltage from SENSE at FSENSE 104 largely equal to the voltage at VDIV 102. If the filtered voltage SENSE, FSENSE 104, is largely equal to the voltage at VDIV, then the power factor of the electrical circuit 200 is largely 1. This condition is achieved by introducing the amplifier X26. The purpose of the amplifier X26 is to close the loop by controlling the gain of the voltage controlled resistor Gsense 110 and drive the voltage on node FSENSE 104 as close as possible to the voltage on node VDIV. The result is that the voltage difference between FSENSE 104 and VDIV 102 has largely no voltage at the fundamental frequency. The resultant difference is due to power factor deviations.

The resistors R74 and R44 and capacitors C46 and C47 filter out the high frequency switching noise in the input voltage and reduce the bandwidth of FSENSE to some multiples of the input frequency to obtain a smoothed signal presented at the negative input of amplifier X26. The sinusoidal signal on VDIV 102 is connected to the positive input of the amplifier X26. The output of the amplifier X26 is provided to a low pass filter having a few hertz bandwidth. The low pass filter is formed by resistor r46 and capacitor C30 to produce 106. The filtered output of the amplifier X26 is provided to the control terminal of the voltage variable resistor Gsense. The functionality of the amplifier X26 and the low pass filter is to make the voltage on FSENSE 104 as close as possible to the voltage on VDIV 102 averaged over a number of cycles of the AC supply. The voltage difference between VDIV 102 and FSENSE 104 are largely the deviations from the fundamental frequency, that is, the overtones or harmonics from the fundamental frequency and possibly phase shifts. Thus, the fundamental frequency is largely removed in the voltage difference between VDIV 102 and FSENSE 104.

Another function of the amplifier X26 is to limit the number of harmonics admitted to the correction circuitry. This is accomplished with the feedback capacitor C41 and the resistor R44. The feedback capacitor C41 and the resistor R44 limit the bandwidth of the difference signal between VDIV 102 and FSENSE 104 largely to a few kilohertz. The second difference 108 between VDIV 102 and FSENSE 104 includes the overtones which are to be removed by the electrical circuit through amplifier X22 130. Amplifier X22 works to reduce the remaining components of second difference 108, which contain the PFC errors, largely to zero.

The output voltage is controlled by amplifier X_ERRAMP. The dominant pole is created by the output capacitor C2. The output voltage VLOAD is divided by resistor divider R6 and R7. The divided voltage, FB 118, is presented to the negative input of amplifier X_ERRAMP. A reference voltage generated by the reference 160 is provided to the positive input of the amplifier X_ERRAMP 140. The amplifier X_ERRAMP 140 can be a current output amplifier with a current output. The current output of amplifier X_ERRAMP is introduced to the resistor Rerr to be converted to a voltage. Rerr sums the output currents of amplifier X22 and X_ERRAMP and converts the currents to a voltage, the first control signal 116. The error voltage on node ERR is presented to the circuitry X21. The circuitry X21 converts error voltage to duty factor of the MOSFET X12.

In some error conditions, if the inductor L1 current does not drop to zero before the end of the cycle of the converter 115, a new cycle is not initiated. If the current in the inductor L1 exceeds a limit, the MOSFET X12 is turned off to protect the MOSFET switch. If the output voltage exceeds a limit, the cycle of the converter 115 is turned off to protect the load.

Overtone removal occurs through the amplifier X22 130. The output of amplifier X22 130 is summed with the output of the amplifier X_ERRAMP 140. The amplifier X22 130 forces the current in GSENSE to be largely sinusoidal by removing the residual, non-sinusoidal, components in the load current. This is accomplished by minimizing the difference between FSENSE 104 and VDIV 102.

In some embodiments, the inductor L1, can be replaced by a transformer, such that the magnetic energy is transferred to the output via a secondary winding. The electrical circuit with the transformer can be similar to the electrical circuit 200 except for using another form of feedback, such as an optocoupler, to regulate the output voltage. To operate, the output of the optocoupler needs to be summed with the output of the amplifier X22 130.

For an AC to DC converter to work, the output bandwidth is required to be approximately equal to or less than the frequency of the input AC signal, otherwise the output would substantially vary as the input voltage. For the overtone removal to work, the output current from amplifier X22 needs to have a bandwidth significantly higher than several multiples of the input voltage frequency. Thus, the pole of capacitor C40 and resistor Rerr needs to be substantially greater than the unity gain bandwidth of the dominant pole of capacitor C2 of the main error loop.

The electrical circuit 200 can be adapted to work on a three-phase input, keeping the phases in balance. In this case the input current needs to be measured by a different method, other than a resistor in the ground line, because the ground current of all three phases flows in the resistor. This limitation can be overcome by use of current transformers in the three legs of the three-phase bridge rectifier and the use of matched harmonic amplifiers coupled with matched error amplifiers. The current in each of the three legs might be leveled, further improving power factor on the higher level of the three phase system.

Figure 3:
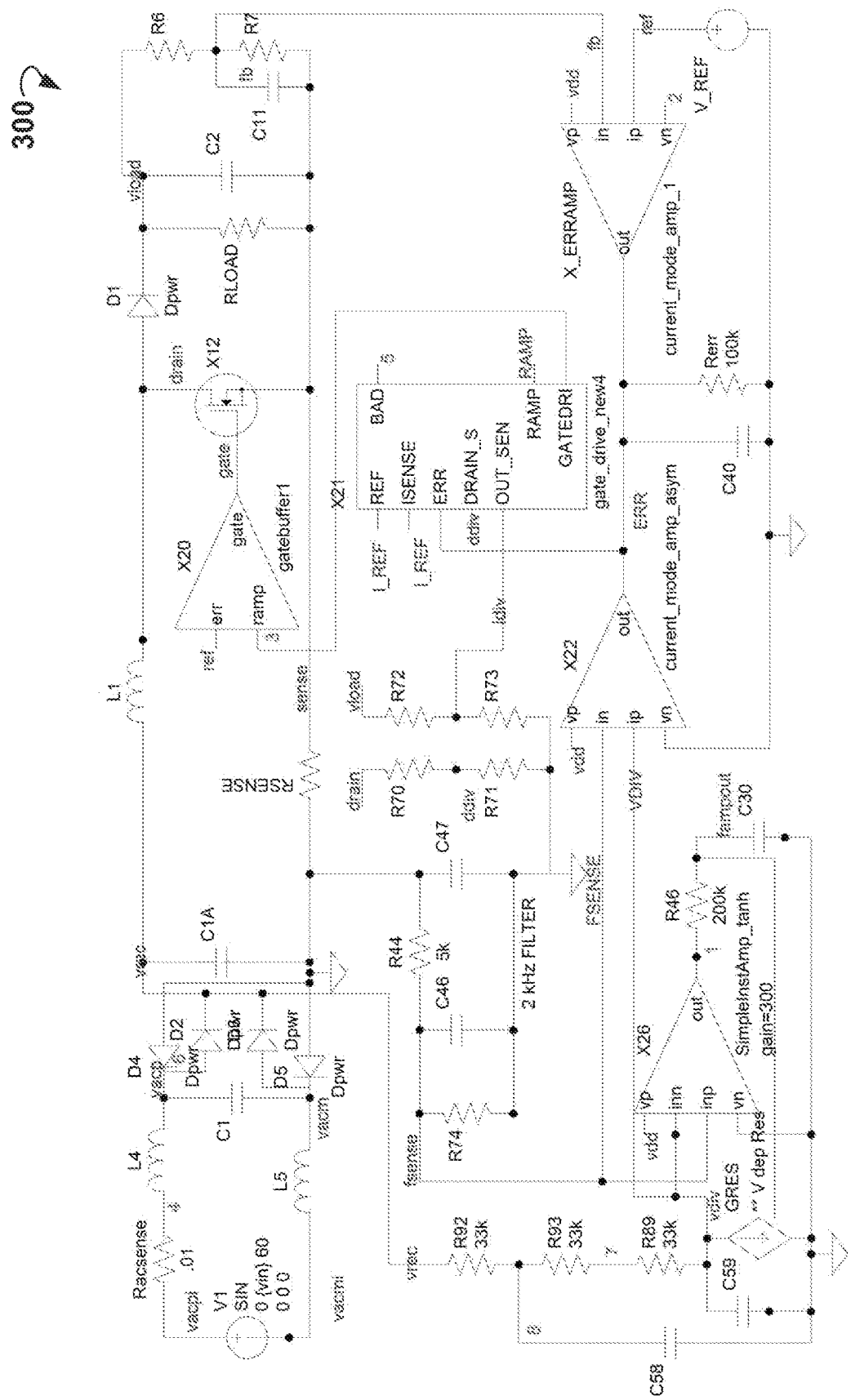
FIG. 3 is a block diagram showing an example electrical circuit for PFC, according to another example embodiment.

FIG. 3 is a block diagram showing an example electrical circuit 300 for power factor correction, according to another example embodiment. The electrical scheme 300 can be an implementation of the electrical circuit 100 shown in FIG. 1. The electrical scheme 300 is a modification of the electrical scheme 200. The difference between the electrical circuit 200 is that the adaptive current sense with feedback 110 (variable voltage resistor Gsense) in the circuit 300 is replaced with a fixed resistor Rsense and the resistor R88 is replaced with variable voltage resistor Gres. The general operation is similar except now FAMPOUT 106 is connected to Gres. Also, the inputs to the amplifier X26 are reversed.

Figure 4:
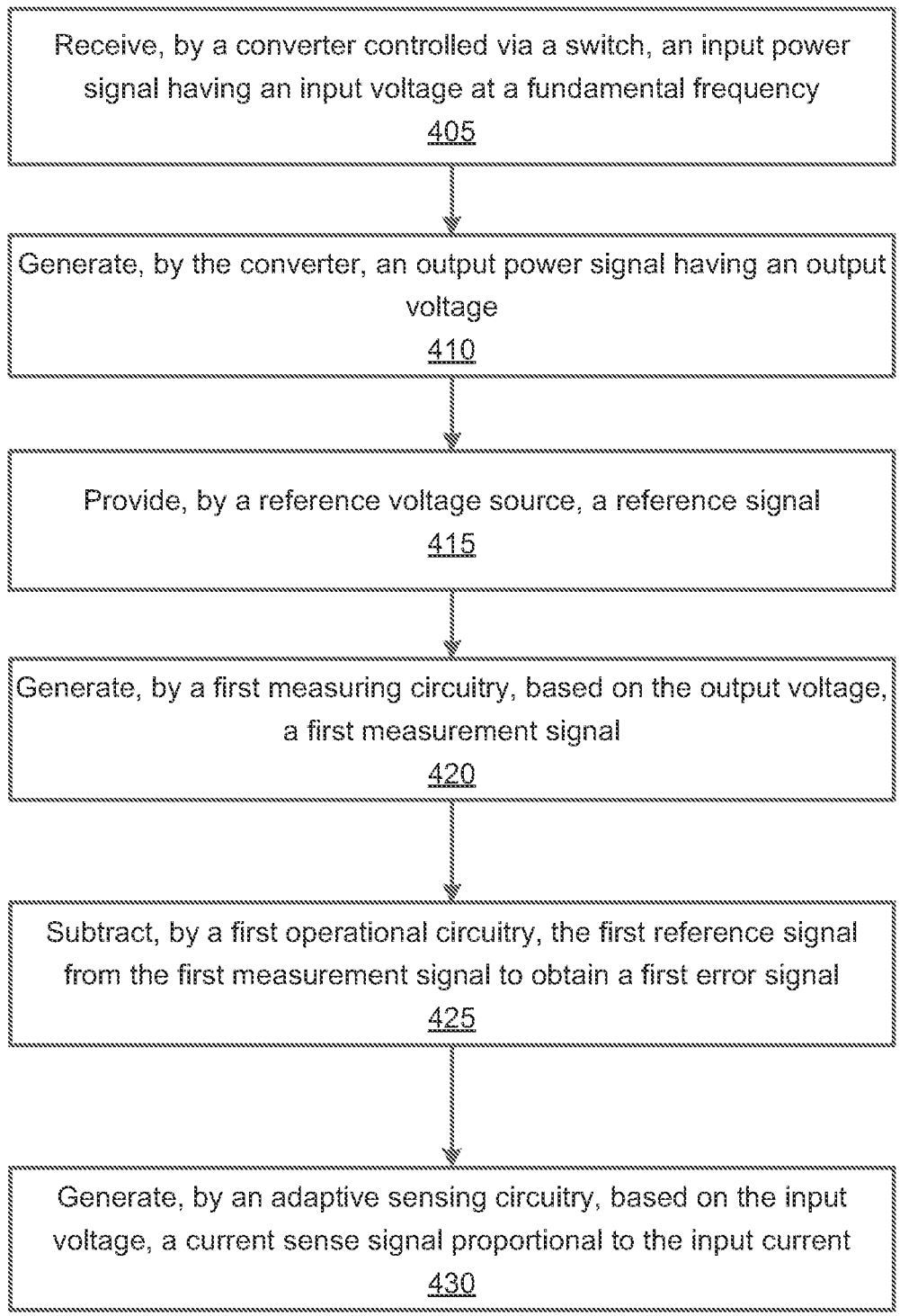
FIG. 4 is a flow chart showing steps of method for PFC, according to some example embodiments.
Figure 4A:
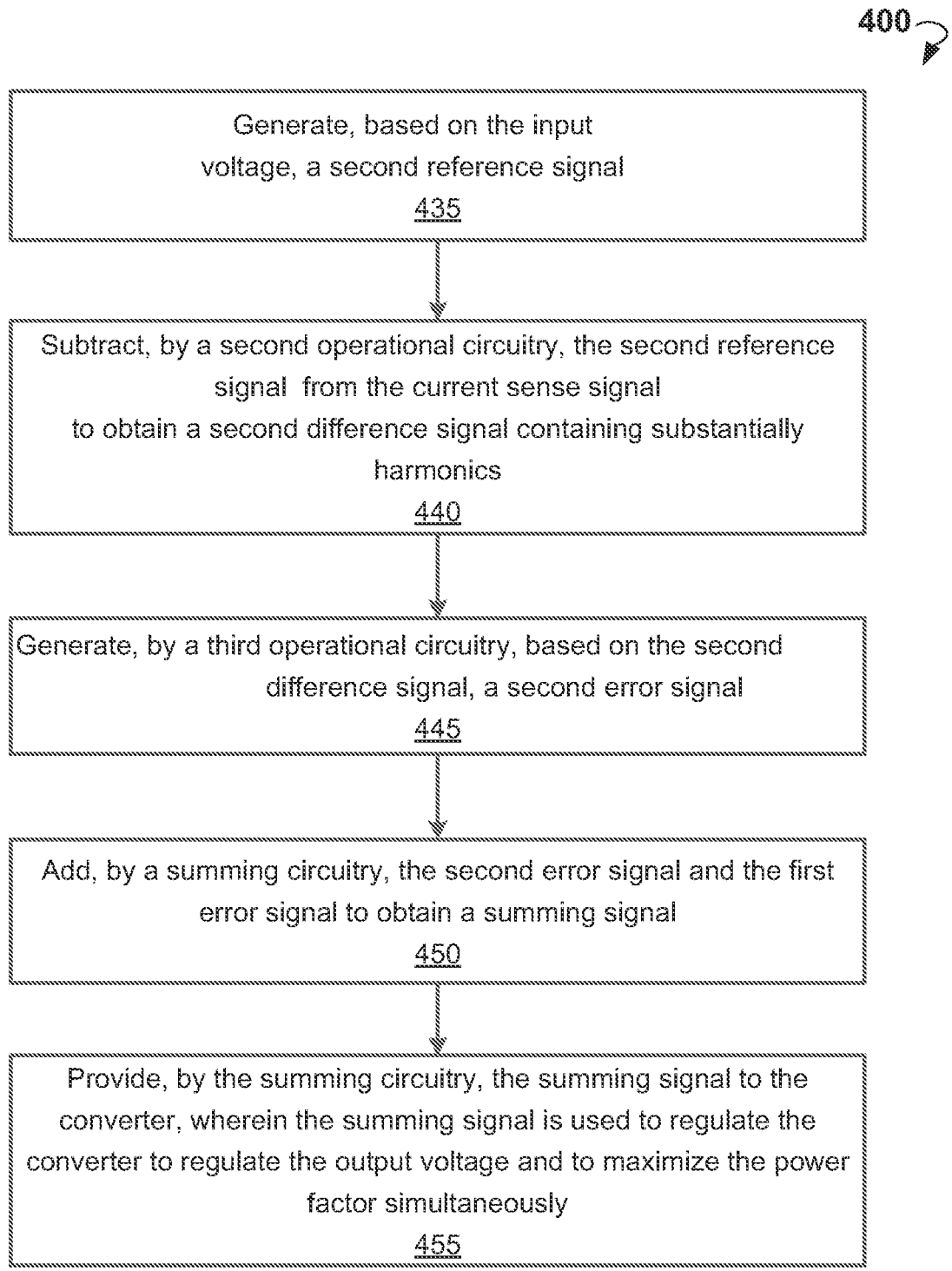
FIG. 4A is a flow chart showing additional steps of a method for PFC, according to some example embodiments.

FIG. 4 is a flow chart of method 400 for power factor correction, according to some example embodiments. The method 400 can be implemented, for example, by the electrical circuit 200 shown in FIG. 2.

In block 405, the method 400 may commence with receiving, by a converter controlled via a switch, an input power signal having an input voltage at a fundamental frequency. The switch is configured to regulate a current in the inductor or transformer responsive to a first control signal. In other embodiments the converter may include one or more inductors or one or more one or more transformers, and one or more switches.

In block 410, the method 400 may include generating, by the converter, an output power signal having an output voltage. The switch of the converter can be controlled by a pulse width modulator. The output of the switch can be controlled by regulating a duty cycle of the pulse width modulator and without changing a frequency of turning the switch on and off.

In block 415, the method 400 may include providing, by a reference voltage source, a reference signal.

In block 420, the method 400 may include generating, by a first measuring circuitry, based on the output voltage, a first measurement signal.

In block 425, the method 400 may include subtracting, by a first operational circuitry, the first reference signal from the first measurement signal to obtain a first error signal. The first error signal is responsive to the output of the converter.

In block 430, the method 400 may include generating, by an adaptive sensing circuitry, based on the input voltage, a current sense signal proportional to the input current. The adaptive sensing circuitry may include a voltage variable resistor. This resistor may be a MOSFET, JFET, or a digitally controlled resistor.

In block 435, the method 400 may include generating, by a second measurement circuitry, based on the input voltage, a second reference signal. The second reference signal is a rectified sinusoidal signal. The second measurement circuitry may include a voltage variable resistor. The second measurement circuitry may include a current transformer in some embodiments.

In block 440, the method 400 may include subtracting, by a second operational circuitry, the second reference signal from the current sense signal to obtain a second difference signal. The difference signal is minimized by controlling a response of the adaptive sensing circuitry utilizing a voltage variable resistor to take the average of the difference signal. The difference signal then includes substantially only overtones of the fundamental frequency and lacks substantially a signal corresponding to the fundamental frequency.

In block 445, the method 400 may include generating, by a third operational circuitry, based on the second difference signal, a second error signal. A bandwidth of the first error signal can be less than a bandwidth of the second error signal. The maximum amplitude of the second error signal is nominally less than the maximum amplitude of the first error signal.

In block 450, the method 400 may include adding, by a summing circuitry, the second error signal and the first error signal to obtain a summing signal (the first control signal); and In block 455, the method 400 may include providing, by the summing circuitry, the summing signal to the switch, wherein the summing signal is used to regulate the switch of the converter, in order to regulate the output voltage and to substantially maximize the power factor simultaneously.

The present technology is described above with reference to example embodiments. Therefore, other variations upon the example embodiments are intended to be covered by the present disclosure.

What is claimed is:

1. An electrical circuit power supply with power factor correction, the electrical circuit power supply comprising:
   a switch-mode converter;
   a means for controlling the switch-mode converter with a first control signal in order to control currents in the switch-mode converter to control and regulate one of an output voltage or an output current, and to control a power factor of an input current from a sinusoidal voltage source or rectified sinusoidal voltage source at a constant or slowly varying first frequency;
   a means for measuring one of the output voltage or the output current and comparing one of the output voltage or the output current to a first reference signal, and generating a first error signal responsive to a first difference between the first reference signal and one of the output voltage or the output current, the first error signal having a first error frequency bandwidth;
   a current measurement means for measuring the input current and generating a current measurement signal from the input current;

a means for generating a second reference signal, the second reference signal comprising a sinusoidal reference voltage or a rectified sinusoidal reference voltage derived from an input voltage, and generating a second difference by subtracting the second reference signal from the current measurement signal; and a means for generating a second control signal that is proportional to the second difference, the second control signal having a control signal frequency bandwidth, the second control signal being used to control one of a gain or a magnitude of the current measurement signal in order to minimize the second difference.

2. The electrical circuit power supply of claim 1, wherein the current measurement means is a field effect device.

3. The electrical circuit power supply of claim 1, wherein the current measurement means is a Metal Oxide Silicon Field Effect Transistor (MOSFET).

4. The electrical circuit power supply of claim 1, wherein the current measurement means is one of a digitally controlled resistor or a digital-to-analog converter.

5. The electrical circuit power supply of claim 1, wherein the current measurement means utilizes a current transformer.

6. The electrical circuit power supply of claim 1, wherein the second control signal is a voltage.

7. The electrical circuit power supply of claim 1, wherein the second control signal is a digital signal.

8. The electrical circuit power supply of claim 1, wherein the first error signal is a voltage.

9. The electrical circuit power supply of claim 1, wherein the first error signal is a digital signal.

10. The electrical circuit power supply of claim 1, further comprising:
a means for generating a second error signal that is proportional to the second difference, the second error signal having a second error frequency bandwidth; and
a means for combining the second error signal with the first error signal to generate the first control signal.

11. The electrical circuit power supply of claim 10, wherein the second error signal is a voltage or a digital signal.

12. The electrical circuit power supply of claim 10, wherein the second error frequency bandwidth of the second error signal is greater than the constant or slowly varying first frequency.

13. The electrical circuit power supply of claim 10, wherein the second error frequency bandwidth of the second error signal is greater than the first error frequency bandwidth of the first error signal.

14. The electrical circuit power supply of claim 10, wherein a maximum magnitude of the second error signal is less than a maximum magnitude of the first error signal.

15. The electrical circuit power supply of claim 1, wherein the first control signal is a voltage.

16. The electrical circuit power supply of claim 1, wherein the first control signal is a digital signal.

17. The electrical circuit power supply of claim 1, wherein the second difference is a voltage.

18. The electrical circuit power supply of claim 1, wherein the second difference is a digital signal.

19. The electrical circuit power supply of claim 1, wherein the control signal frequency bandwidth is less than the constant or slowly varying first frequency.

20. An electrical circuit power supply with power factor correction, the electrical circuit power supply comprising:
a switch-mode converter;
a means for controlling the switch-mode converter with a first control signal in order to control currents in the switch-mode converter in order to control and regulate one of an output voltage or an output current, to control a wave form of an input current, and to maximize a power factor, the input current being received from a sinusoidal voltage source or a rectified sinusoidal voltage source at a constant or slowly varying first frequency;

a means for measuring one of the output voltage or the output current and comparing one of the output voltage or the output current to a first reference signal, and generating a first error signal responsive to a first difference between the first reference signal and one of the output voltage or the output current, the first error signal having a first error frequency bandwidth;

a current measurement means for measuring the input current and generating a current measurement signal from the input current;

a means for generating a second reference signal comprising of an alternating current (AC) reference signal proportionately reduced from an input voltage by a means of a controlled voltage divider responsive to a second control signal;

a first means for controlling a magnitude of a reduction of the input voltage and generating a second difference by subtracting the AC reference signal from the current measurement signal; and a means for generating the second control signal that is proportional to the second difference, the second control signal having a control signal frequency bandwidth, the second control signal driving the first means in order to minimize the second difference.

21. The electrical circuit power supply of claim 20, wherein the current measurement means includes one of a resistor, a gate field-effect transistor (JFET), a Metal Oxide Silicon Field Effect Transistor (MOSFET), or a digitally controlled resistor bridge.

22. The electrical circuit power supply of claim 20, wherein the current measurement means utilizes a current transformer.

23. The electrical circuit power supply of claim 20, wherein the controlled voltage divider is a resistor divider with a voltage variable resistor.

24. The electrical circuit power supply of claim 23, wherein the voltage variable resistor is a MOSFET, a field effect device, or a digitally controlled resistor divider.

25. The electrical circuit power supply of claim 20, wherein the second control signal is a voltage.

26. The electrical circuit power supply of claim 20, wherein the second control signal is a digital signal.

27. The electrical circuit power supply of claim 20, wherein the first error signal is a voltage.

28. The electrical circuit power supply of claim 20, wherein the first error signal is a digital signal.

29. The electrical circuit power supply of claim 20, further comprising:
a means for generating a second error signal that is proportional to the second difference, the second error signal having a second error frequency bandwidth; and
a means for combining the second error signal with the first error signal to generate the first control signal.

30. The electrical circuit power supply of claim 29, wherein the second error signal is a voltage or a digital signal.

31. The electrical circuit power supply of claim 29, wherein the second error frequency bandwidth of the second error signal is greater than the first error frequency bandwidth of the first error signal.

32. The electrical circuit power supply of claim 29, wherein a maximum magnitude of the second error signal is less than a maximum magnitude of the first error signal.

33. The electrical circuit power supply of claim 20, wherein the second difference is a voltage.

34. The electrical circuit power supply of claim 20, wherein the second difference is a digital signal.

35. The electrical circuit power supply of claim 20, wherein the control signal frequency bandwidth of the second control signal is less than the constant or slowly varying first frequency.

36. The electrical circuit power supply of claim 20, wherein the control signal frequency bandwidth is greater than the constant or slowly varying first frequency.

* * * * *